UNITED STATES PATENT OFFICE.

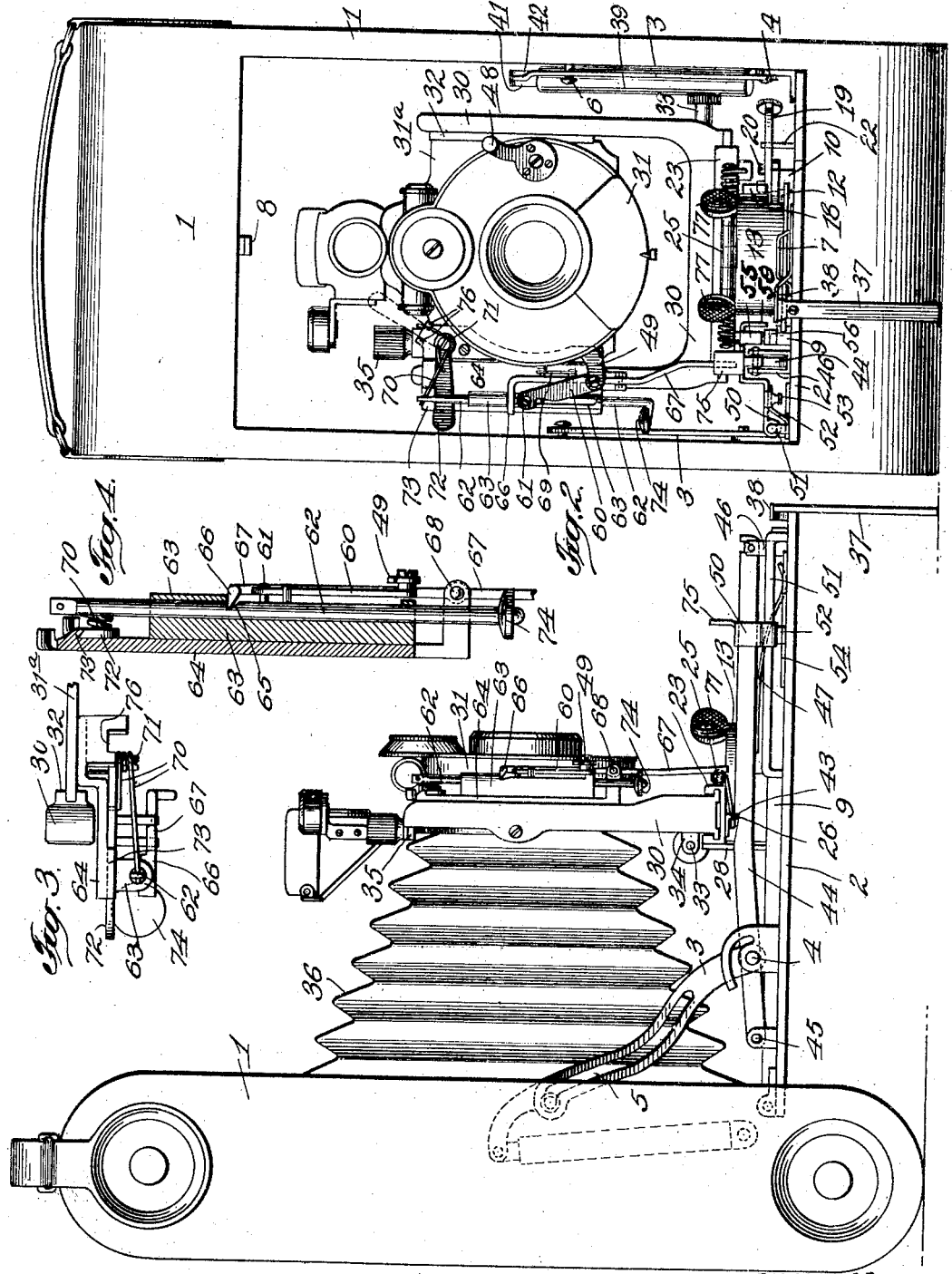

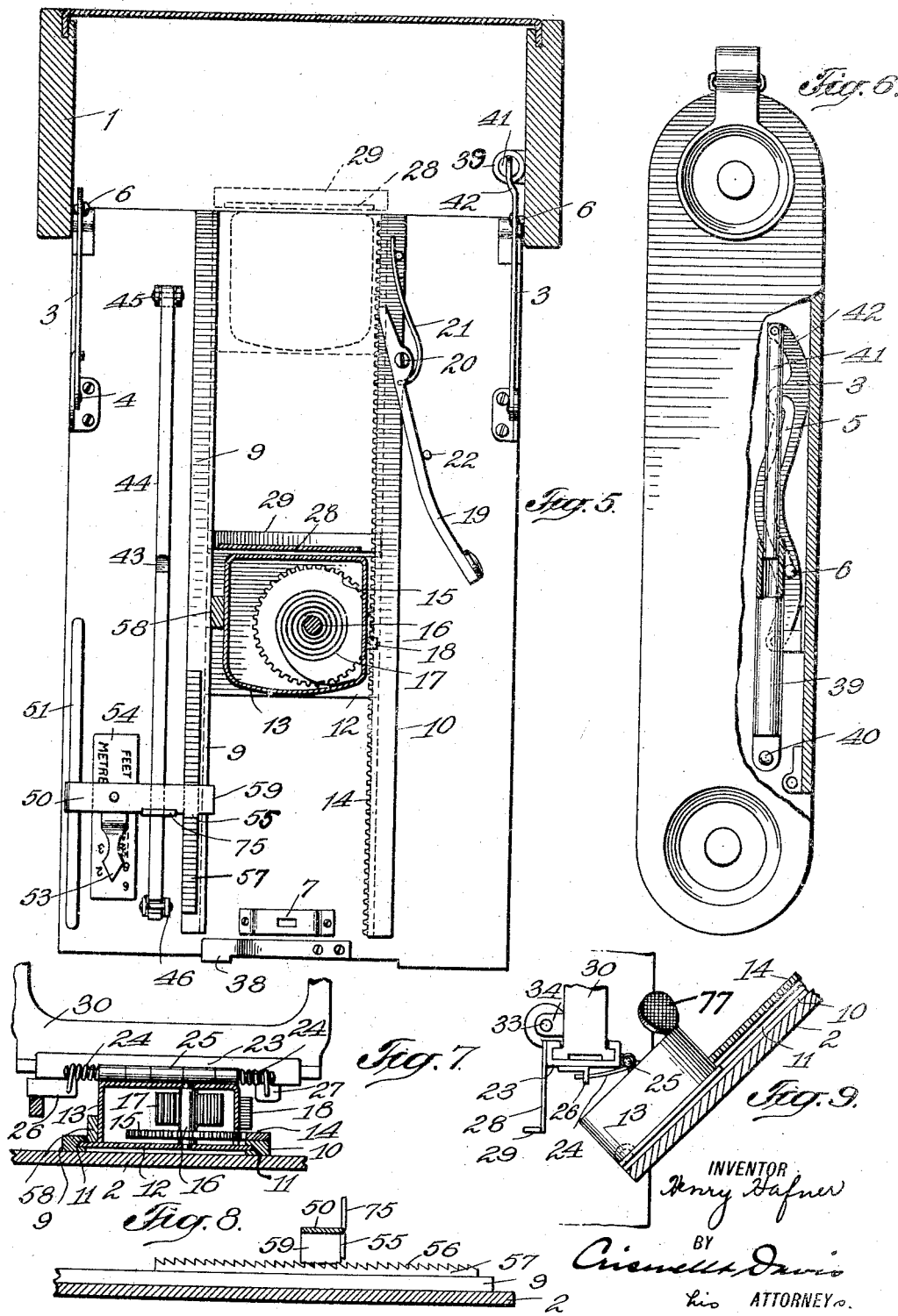

HENRY HAFNER, OF BROOKLYN, NEW YORK.

CAMERA.

1,246,263. Specification of Letters Patent. Patented Nov. 13, 1917.

Application filed April 17, 1917. Serial No. 162,607.

*To all whom it may concern:*

Be it known that I, HENRY HAFNER, a citizen of the United States, and a resident of Brooklyn, county of Kings, and State of New York, have invented certain new and useful Improvements in Cameras, of which the following is a full, clear, and exact description.

This invention relates to improvements in cameras and is particularly applicable for use in connection with folding cameras.

The principal object of the invention is to provide means automatically actuating the shutter to make an exposure when the lens is moved to the desired focal point.

A further important object of the invention is to provide power operated means for rapidly projecting the lens and its supporting means to the desired focal point.

Another object of the invention is to provide means for projecting the lens and its support to a point approximating the desired focal point and automatically locking it at that point until the operator has ascertained the distance to the object and has adjusted the camera to bring the object within the field thereof, whereupon the lens may be quickly projected to the exact focal point and the exposure automatically made.

A further object of the invention is to provide means whereby the lens may be projected to the desired focal point without operating the shutter, and to provide manually operated means whereby the shutter may be actuated to make the exposure after the lens has been adjusted to the proper focal point.

A further object of the invention is to provide means for retarding the outward and downward movement of the hinged lens-supporting front wall of the camera casing to relieve the parts from excessive jarring when the camera is unfolded.

Another object of the invention is to provide improved means for supporting the lens box and associated parts to fold within the body portion of the camera casing.

In the accompanying drawings, Figure 1 is a side elevation of the camera showing the lens box and its supporting mechanism partially projected;

Fig. 2 a front elevation, with the parts in the position shown in Fig. 1;

Fig. 3 a detail plan view of the shutter tripping devices;

Fig. 4 a detail side elevation, partly in section, of the shutter tripping means;

Fig. 5 a horizontal sectional view;

Fig. 6 a side elevation, partly in section, of the camera folded, showing the retarding device connected with the hinged front wall of the casing;

Fig. 7 a detail transverse section showing the propelling means for the lens box support and the foldable connection between the lens box support and the front wall of the casing;

Fig. 8 a detail sectional view showing the focus indicator and adjustable stop for the lens box support; and Fig. 9 a detail view showing the foldable connection between the lens box support and the hinged front wall of the casing, the parts being shown in partly folded position.

The camera comprises a casing having a box-like body portion 1, having a hinged front wall or plate 2 adapted to swing outwardly and downwardly. A pair of curved links 3, are pivotally held at 4 to the front plate 2 and are formed with slots 5. A pair of headed screws or studs 6 are fixed to the opposite side walls of the casing and extend through the slots 5 for holding the plate 2 in a horizontal position at right angles to the body portion 1 when the camera is opened. At its upper edge the plate 2 is provided with an apertured plate 7 adapted to be engaged by the usual spring pressed latch 8 commonly employed in cameras of this type to hold the hinged plate in closed position.

The body portion 1 of the casing may be of any suitable construction, and may be provided with any suitable film or plate holding and feeding means.

Fixed to the plate 2 and extending longitudinally thereof are two parallel ways or tracks 9 and 10 having grooves 11 in their inner faces. The base plate 12 of a motor casing 13 is slidably held at its opposite side edges in the grooves 11 formed in tracks 9 and 10. A rack 14 is fixed to the track 10 and meshing with this rack is a gear wheel 15 extending at its periphery through an opening in one side of the casing 13. The gear 15 is fixed to a vertically disposed rotatable shaft 16 journaled in the casing 13. A flat spring 17 is coiled about the shaft 16 and is fixed to the shaft at one end and at its other end is held to the wall of the casing. The spring 17 tends to normally rotate the shaft 16 and gear 15 to propel the casing 13 toward the outer ends of the tracks 9 and 10, and to automatically rewind when the casing is forced toward the rear ends of the tracks. Fixed to one side wall of casing 13 is a laterally projecting stop 18 adapted to engage behind the inner end of a horizontally arranged stop lever 19 pivoted intermediate its ends at 20 to the plate 2. A spring 21 normally forces the inner end of the lever inwardly into the path of the stop 18. A stop 22 on plate 2 limits the movement of the lever 19 under the influence of spring 21.

A channel-shaped way or base 23 is hinged at its forward edge to the top wall of the motor casing and is normally held in a horizontal position upon the top of the casing by springs 24 coiled about the pintle of the hinge 25 and fixed to projections or lugs 26 and 27 depending from the way or base at opposite sides of the casing 13. The springs 24 also tend to force the plate 2 outwardly and downwardly when the catch 8 is released. A depending plate 28 is rigidly fixed to the rear edge of the base or way 23 and at its lower edge is formed with a rearwardly extending horizontal flange 29. The extended side edges of the flange 29 are adapted to engage in the grooves 11 in tracks 9 and 10 when the casing 13 moves outwardly along the tracks, but the flange is so positioned that its side edges will be disengaged from the grooves when the casing is locked in its rear position by stop lever 19, as shown in Figs. 5 and 9, to permit the casing to fold relatively to the base or way 23. The plate 28 and flange 29 serve to positively lock the base 23 in a horizontal position on the casing when the casing is moved outwardly along the tracks 9 and 10.

A substantially U-shaped frame or support 30 is mounted on the base 23 and is slidably held thereto to move transversely of the plate 2. A casing or lens and shutter box 31, containing the lens, shutter, and associated devices, is mounted in the frame or support 30 to slide vertically in suitable guide-ways 32 on the frame. The lens box support may be adjusted transversely in any suitable manner along the base 23, a threaded rod 33 suitably mounted on the base and threaded through a lug 34 on the support being preferably employed for this purpose. A similar threaded rod 35 held to the lens box support and threaded in a part carried by the box is provided for adjusting the lens box vertically in the support. The lens and shutter box shown is of the well-known type equipped with a compound shutter and provided with suitable shutter-speed and diaphragm adjusting devices and viewfinding means. The usual collapsible bellows 36 is held at one end within the casing 1, and at its opposite end is held to the rear wall of the lens box. At the outer edge of plate 2 a supporting leg 37 is pivotally held to support the plate 2 at right angles to the casing 1 when the camera is seated in an upright or a horizontal position on a supporting surface, a suitable spring 38 being fixed to the plate 2 and adapted to yieldably hold the leg 37 in either of its adjusted positions.

To use the camera, the latch 8 is released by any suitable means, such as the usual push button at the side of the casing commonly employed in folding cameras, whereupon the springs 24 and the weight of the parts force the plate 2 outwardly and downwardly to a position at right angles to the casing, the motor casing and the attached lens box support being held at the inner end of tracks 9 and 10, as indicated in dotted lines in Fig. 5, by the stop lever 19. To prevent jarring of the parts, I prefer to employ suitable means for retarding the opening movement of the front plate 2. As shown, this means comprises a cylinder 39 pivotally held at 40 to the casing 1 and having a closed lower end. Working in the cylinder 39 is a solid piston 41 pivotally connected at its upper end to an extension 42 carried by one of the links 3. When the plate 2 moves downwardly the piston 41 is forced downwardly in the cylinder 39, the air gradually leaking out around the sides of the piston, and permitting the plate 2 and the piston to gradually move downwardly.

Upon releasing the lever 19 from engagement with stop 18 on the motor casing 13, the spring motor projects the lens box support 30 and casing 13 outwardly to a point about midway the length of tracks 9 and 10 at the rear of the minimum focal adjustment of the lens. The forward movement of the lens is automatically stopped at this point by the engagement of lug 26 on the base 23 in a notch 43 formed in the upper edge of a lever 44. The lever 44 is pivotally held at its rear end at 45 to the plate 2 and its free outer end is guided in a U-shaped bracket 46, the upward movement of the lever being limited by a cross bar or pin mounted in the upper ends of the bracket. The lever 44 is yieldably held in raised position by any suitable means, such as a bowed spring 47 held at one or both ends to plate 2.

The camera is provided with the usual shutter speed and diaphragm adjusting devices and, if a compound shutter is employed the usual shutter-setting lever 48 is provided, this lever being moved upwardly to the position shown in Fig. 2 to set the shutter for actuation by the usual shutter-tripping lever 49. The shutter lever actuating means is then set in its automatic tripping position. This means comprises a link 60 pivoted at its lower end to the outer end of the shutter tripping lever 49 and pivotally connected at its opposite end with a pin 61 fixed on a vertically reciprocable rod 62. The rod 62 is slidably held in the slotted tubular guide 63 fixed to the plate 64 rigidly held to the vertically slidable lens-box support or frame 31ª held in the ways 32 in the U-shaped support 30, and the pin 61 projects outwardly through the vertical slot formed intermediate the ends of guide 63. The rod 62 is formed with a notch 65 in which the offset end 66 of a lever 67 is adapted to engage when the rod 62 is moved upwardly to lock said rod in raised position. The lever 67 is pivoted intermediate its ends on a horizontal pivot 68 in a bracket held to plate 64. The upper end of the lever 67 is normally forced inwardly by a suitable spring 69 into position to snap into the notch 65 when rod 62 is raised. A spring 70 is coiled about a stud 71 on plate 64 and one end of said spring is held to the upper end of rod 62, the other end of said spring being held to a swinging lever or arm 72 loosely pivoted on said stud 71.

To set the shutter-operating mechanism to automatically trip the shutter the lever 72 is moved to the position shown in full lines in Figs. 1 to 4, where the lever is held by a stop 73 formed on plate 64, with the spring 70 exerting a downward pressure on rod 62. The rod 62 is raised against the tension of spring 70 by means of a finger-piece 74 until the offset end 66 of lever 67 engages in the notch 65 in the rod and locks the rod in raised or set position.

To advance the lens and automatically make the exposure as the lens reaches the proper focal point, the slide bar 50, pivotally and slidably mounted on the bracket 51, and normally held in raised position by a spring 52 held thereto and slidably engaging plate 2 at its lower free end, is then adjusted along the bracket 51 until the pointer 53 carried by the slide is opposite the desired point on the focusing scale plate 54 fixed on plate 2. The slide 50 is then rocked on its pivot to cause the free end of slide to depress the lever 44. This operation causes a stop 55, carried by the slide to engage behind one of the teeth 56 on a rack 57, fixed on track 9 or otherwise held to the frame, and also releases lug 26 on base 23 of the lens support from the notch 43 in lever 44. The motor thereupon automatically projects the casing 13 and the lens support toward the outer end of the tracks 9 and 10 until a stop 58 fixed on the side of the motor casing engages a stop 59 carried by the free end of slide 50, whereupon the lens is held in the proper focal plane by stops 55, 58 and 59.

As the stop 58 engages stop 59, the lower end of lever 67 strikes a stop 75 carried by slide 50 and rocks the lever on its pivot to release rod 62. The spring 70 thereupon forces rod 62 downwardly and, through link 60, depresses the shutter lever 49, thereby actuating the shutter in the usual manner to make the exposure.

It is sometimes desirable to project the lens to the desired focal point without automatically actuating the shutter, in order that the exposure may subsequently be made manually. To set the shutter operating mechanism for manual operation the lever 72 is moved to the position shown in dotted lines in Fig. 2, in which position it is held in a forked rest or stop 76 formed on the plate 64. In this position of the lever 72 the spring 70 holds the rod 62 yieldably in raised position. The lever 67 engages in notch 65, as before described, and serves to prevent accidental depression of rod 62 by pressure thereon or on thumb-piece 74. The lens is projected to the desired focal point in the manner described in connection with the automatic operation and the lever 67 rocked to release rod 62. The rod 62, however, is held up by the spring 70 and the shutter is not operated. To make the exposure the rod 62 is depressed by pressing upon the thumb-piece 74, whereupon the shutter is actuated through link 60 and the shutter lever 49.

To make successive exposures the lens support is moved rearwardly after each operation until lug 26 engages in notch 43 on lever 44, the shutter operating mechanism is reset, and the lens support again projected to bring the lens into the desired focal plane, in the manner above described.

To fold the camera, the operator grasps finger pieces 77 on motor casing 13 and forces the casing and the lens-supporting frame carried thereby rearwardly to the position indicated in dotted lines in Fig. 5, where it is automatically locked by stop lever 19 in the manner heretofore described. It will be seen that the casing 13 is held to the tracks 9 and 10 while the feet 29 on the plate 28 are released from the grooves in said tracks, thus permitting the plate 2 and casing 13 to fold upwardly and rearwardly and move the support 30 and attached parts rearwardly into the casing, as shown in Fig. 9. The front plate is locked in closed position by catch 8 as above described.

From the foregoing, it will be seen that simple means has been provided for rapidly projecting the lens to a point approximating the minimum focal plane, and subsequently quickly projecting the lens to the exact focal point desired, and that simple means has been provided whereby the shutter may be manually operated after the lens has been adjusted to the desired point or whereby the exposure may be made automatically, as desired.

What I claim is:—

1. In a camera, the combination of a casing, a lens, a shutter, means for supporting the lens and shutter, power-operated means for projecting the lens and shutter supporting means toward the focal point, and means for arresting the movement of the lens supporting means when the lens reaches the desired focal point and simultaneously actuating the shutter.

2. In a camera, the combination of a casing, a lens, means for supporting the lens, power-operated means for projecting the lens toward the focal point, and means for arresting the movement of the lens-supporting means at the desired focal point.

3. In a camera, the combination of a casing, a lens, power-operated means for projecting the lens toward the focal point, an adjustable focal distance indicating means held to the casing, and means actuated by said indicator for causing the power-operated means to move the lens to the focal plane for which said indicating means is set.

4. In a camera, the combination of a casing, a lens, means normally tending to move the lens toward the focal point, an adjustable focal distance indicator, and means actuated by said indicator for controlling the operation of said lens-moving means.

5. In a camera, the combination of a casing, a lens, means normally tending to move the lens toward the focal point, means for holding the lens in retracted position, an adjustable focal distance indicating means held to the casing, means actuated by said indicating means for releasing the lens-moving means, and means carried by said indicating means for arresting the movement of the lens at the focal point for which said indicating means is adjusted.

6. In a camera, the combination of a casing, a lens, means normally tending to move the lens toward the focal point, means for locking the lens in retracted position, means for automatically arresting the movement of the lens at a point approximating the focal point, means for releasing said arresting means, and means for arresting the movement of the lens at the desired focal point.

7. In a camera, the combination of a casing, a lens, means normally tending to move the lens toward the focal point, means for holding the lens in retracted position, means for automatically arresting the movement of the lens at a point approximating the focal point, an adjustable focal distance indicator, connections between said indicator and said arresting means for releasing the arresting means, and means carried by said indicator for holding the lens at the desired focal point.

8. In a camera, the combination of a casing having a hinged wall, a lens, means shiftably held to said hinged wall for supporting the lens to fold into and out of the casing, means tending normally to shift the lens support along said hinged wall to move the lens toward the focal point, latching means adapted to hold the lens support in retracted position adjacent one end of said hinged wall in all positions of the wall, an adjustable focal distance indicator, and means for arresting the movement of the lens at the focal point for which said indicator is adjusted.

9. In a camera, the combination of a casing having a hinged wall, a lens, means held to said hinged wall for supporting the lens to fold into and out of the casing, means tending normally to project the lens to the focal point, means for locking the lens in retracted position, an adjustable focal distance indicator, and means carried by said indicator for arresting the movement of the lens at the desired focal point.

10. In a camera, the combination of a casing having a hinged wall, a lens, means held to said hinged wall for supporting the lens to fold into and out of the casing, means tending normally to project the lens to the focal point, means for locking the lens in retracted position, means for automatically arresting the movement of the lens at a point approximating the desired focal point, an adjustable focal distance indicating slide, means actuated by said slide for releasing said arresting means, and means carried by the slide for holding the lens at the desired focal point.

11. In a camera, the combination of a casing, a lens, a shutter, means normally tending to move the lens and shutter toward the focal point, an adjustable focal distance indicator, means actuated by said indicator for controlling the operation of said lens moving means, and means actuated by said indicator for automatically operating the shutter when the lens is moved to the desired focal plane.

12. In a camera, the combination of a casing, a lens, a shutter, means normally tending to move the lens and shutter toward the focal point, means for locking the lens and shutter in retracted position, means for automatically arresting the movement of the lens and shutter at a point approximating the focal point, means for releasing said arresting means, means for stopping the movement of the lens at the desired focal point, and means automatically actuating the shutter when the lens reaches the desired focal point.

13. In a camera, the combination of a casing, a lens, a shutter, a shiftable support for the lens and shutter mounted on the casing, power-operated means for shifting the support to move the lens toward the focal point, an adjustable focal distance indicator held to the casing, and means carried by said supporting means adapted to be operated by said indicator for automatically actuating the shutter when the lens reaches the focal point for which said indicator is adjusted.

14. In a camera, the combination of a casing, a lens, a shutter, means for supporting the lens and shutter, power-operated means for moving the lens to the desired focal point, an adjustable focal distance indicator, and means actuated thereby for arresting the lens at the desired focal point and automatically actuating the shutter.

15. In a camera, the combination of a casing, a lens, means normally tending to move the lens toward the focal point, means for holding the lens in retracted position, means for automatically arresting the movement of the lens at a point approximating the focal point, an adjustable focal distance indicator, connections between said indicator and said arresting means for releasing the arresting means, means carried by said indicator for holding the lens at the desired focal point, and means operated by said indicator for actuating the shutter when the lens reaches the desired focal point.

16. In a camera, the combination of a casing having a hinged front wall, a lens, a lens-supporting frame hinged to said front wall and adapted to fold into the casing when said front wall is moved to closed position, and means for retarding the opening movement of said front wall of the casing.

17. In a camera, the combination of a casing having a hinged wall, a lens, a shutter, means shiftably held to said hinged wall for supporting the lens and shutter to fold into and out of the casing, means tending normally to shift said support along said hinged wall to move the lens toward the focal point, latching means adapted to hold said support in retracted position adjacent one end of said hinged wall in all positions of the wall, an adjustable focal distance indicator, and means for arresting the movement of the lens at the focal point for which said indicator is adjusted and simultaneously actuating the shutter.

18. In a camera, the combination of a casing having a hinged wall, a lens, a shutter, means held to said hinged wall supporting the lens and shutter to fold into and out of the casing, means tending normaly to project the lens and shutter toward the focal point, means for locking the lens and shutter in retracted position, an adjustable focal distance indicator, means carried by said indicator for arresting the movement of the lens at the desired focal point, and means for automatically actuating the shutter when the lens reaches the desired focal point.

19. In a camera, the combination of a casing having a hinged wall, a lens, a shutter, means held to said hinged wall for supporting the lens and shutter to fold into and out of the casing, means tending normally to project the lens and shutter toward the focal point, means for locking the lens and shutter in retracted position, means for automatically arresting the movement of the lens at a point approximating the desired focal point, an adjustable focal distance indicating slide, means actuated by said slide for releasing said arresting means, means carried by the slide for holding the lens at the desired focal point, and means for automatically actuating the shutter when the lens reaches the focal point for which said indicating slide is adjusted.

20. In a camera, the combination of a casing, a lens, a shutter, power-operated means for moving the lens and shutter toward the focal point, means for arresting the movement of the lens and shutter when the lens reaches the desired focal plane, means for automatically actuating the shutter when the lens reaches the desired focal point, means for rendering the automatic shutter-actuating means inoperative, and means whereby the shutter may be manually actuated.

21. In a camera, the combination of a casing, a lens, a shutter, means for moving the lens and shutter toward the focal point, means for automatically actuating the shutter when the lens reaches the desired focal point, means for rendering the automatic shutter-operating means inoperative, and means whereby the shutter may be manually actuated.

22. In a camera, the combination of a casing having a hinged wall, a lens, a shutter, a foldable support for the lens and shutter slidably held to said hinged wall to adapt the lens and shutter to be moved toward and from the focal point and to be folded within the casing, means normally tending to move said slidable support toward the focal point, a lever held to said hinged wall and formed with a stop adapted to engage said support to arrest the movement of the lens at a point approximating the focal point, yieldable means for normally holding said lever with its stop in the path of said support, an adjustable focal distance indicator mounted on said hinged wall, connections between said indicator and lever for moving said lever to release the lens support from said stop, and means carried by said indicator for arresting the movement of the lens support when the lens reaches the focal point for which said indicator is adjusted.

23. In a camera, the combination of a casing having a hinged wall, a lens, a shutter, a foldable support for the lens and shutter slidably held to said hinged wall to adapt the lens and shutter to be moved toward and from the focal point and to be folded within the casing, means normally tending to move said slidable support toward the focal point, a lever held to said hinged wall and formed with a stop adapted to engage said support to arrest the movement of the lens at a point approximating the focal point, yieldable means for normally holding said lever with its stop in the path of said support, an adjustable focal distance indicator mounted on said hinged wall, connections between said indicator and lever for moving said lever to release the lens support from said stop, means carried by said indicator for arresting the movement of the lens support when the lens reaches the focal point for which said indicator is adjusted, and means operated by said indicator for automatically actuating the shutter when the lens reaches the desired focal point.

24. In a camera, the combination of a casing having a hinged wall, a lens, a shutter, means shiftably held to said hinged wall for supporting the lens and shutter to fold into and out of the casing, means tending normally to shift the lens and shutter support along said hinged wall to move the lens toward the focal point, means for holding the lens support in a retracted position, an adjustable focal distance indicator mounted on said hinged wall, a vertically slidable rod mounted on said lens and shutter support, connections between said rod and the shutter for actuating the shutter when said rod is moved downwardly, means normally tending to move said rod downwardly, a pivoted latch adapted to hold said rod in raised position, and means carried by said indicator adapted to actuate said latch to release said rod when the lens reaches the focal plane for which said indicator is adjusted.

25. In a camera, the combination of a casing having a hinged wall, a lens, a shutter, means shiftably held to said hinged wall for supporting the lens and shutter to fold into and out of the casing, means tending normally to shift the lens and shutter support along said hinged wall to move the lens toward the focal point, means for holding the lens support in a retracted position, an adjustable focal distance indicator mounted on said hinged wall, a vertically slidable rod mounted on said lens and shutter support, a spring mounted on said support and operatively connected with said rod, adjustable means for causing said spring to exert either an upward or downward pressure on said rod, connections between said rod and said shutter for operating the shutter when the rod is depressed, a latch pivotally held to said support and adapted to hold said rod in raised position, and means carried by said focal distance indicator for disengaging said latch from said rod when the lens reaches the focal point for which said indicator is adjusted.

26. In a camera, the combination of means for supporting a sensitized plate or film, a lens, a shutter, a focal distance indicator, and means controlled by said indicator for moving the lens and shutter relatively to said support to place the lens in the focal plane for which said indicator is set.

27. In a camera, the combination of means for supporting a sensitized plate or film, a lens, a shutter, a focal distance indicator, means controlled by said indicator for moving the lens and shutter relatively to said support to place the lens in the focal plane for which said indicator is set, and means for automatically actuating the shutter to make an exposure when the lens is placed in the desired focal plane.

28. In a camera, the combination of means for supporting a sensitized plate or film, a lens, a shutter, an adjustable focal distance indicator, power-operated means controlled by said indicator for moving the lens and shutter relatively to said support to place the lens in the focal plane for which said indicator is adjusted, and means operated by said indicator for causing the shutter to make an exposure when the lens is placed in the focal plane for which the indicator is adjusted.

This specification signed this thirteenth day of April, A. D. 1917.

HENRY HAFNER.

Copies of this patent may be obtained for five cents each, by addressing the "Commissioner of Patents. Washington, D. C."